(12) United States Patent
Joglekar et al.

(10) Patent No.: US 10,003,837 B2
(45) Date of Patent: Jun. 19, 2018

(54) TELEVISION PROGRAMMING DISTRIBUTION NETWORK WITH INTEGRATED DATA GATHERING, MODELING, FORECASTING, DELIVERY, AND MEASUREMENT

(71) Applicant: DISH Network L.L.C., Englewood, CO (US)

(72) Inventors: Prasad Joglekar, Astoria, NY (US); Thomas Rampley, Parker, CO (US); David Shaub, Littleton, CO (US); Eric Harper, Castle Rock, CO (US)

(73) Assignee: DISH Network L.L.C., Englewood, CO (US)

( * ) Notice: Subject to any disclaimer, the term of this patent is extended or adjusted under 35 U.S.C. 154(b) by 0 days. days.

(21) Appl. No.: 15/245,973

(22) Filed: Aug. 24, 2016

(65) Prior Publication Data
US 2018/0063596 A1    Mar. 1, 2018

(51) Int. Cl.
| | | |
|---|---|---|
| *H04N 21/258* | (2011.01) | |
| *H04N 21/25* | (2011.01) | |
| *H04N 21/61* | (2011.01) | |
| *H04N 21/438* | (2011.01) | |
| *H04N 21/2668* | (2011.01) | |

(Continued)

(52) U.S. Cl.
CPC ....... *H04N 21/251* (2013.01); *G06Q 30/0251* (2013.01); *H04N 21/25866* (2013.01);
(Continued)

(58) Field of Classification Search
CPC ........... H04N 21/6143; H04N 21/4383; H04N 21/4627; H04N 21/4826; H04N 21/6193; H04N 21/8126; H04N 21/251; H04N 21/25866; H04N 21/25883; H04N 21/25891; H04N 21/2668; H04N 21/812;
(Continued)

(56) References Cited

U.S. PATENT DOCUMENTS

| | | | | |
|---|---|---|---|---|
| 2003/0145323 A1* | 7/2003 | Hendricks | .............. | H04H 20/10 |
| | | | | 725/34 |
| 2009/0024546 A1* | 1/2009 | Ficcaglia | ............... | G06Q 30/02 |
| | | | | 706/12 |

(Continued)

*Primary Examiner* — Pankaj Kumar
*Assistant Examiner* — Alexander Boyd
(74) *Attorney, Agent, or Firm* — Kilpatrick Townsend & Stockton LLP

(57) ABSTRACT

Various arrangements for using a television programming distribution network with integrated predictive data gathering for distributing content are presented. Using a television service provider network, television programming may be broadcast to bi-directional communication television receivers and addressable television receivers. Viewership information may be collected by a viewership analysis system from the bi-directional communication television receivers. A viewership target model may then be constructed using the viewership information received from the plurality of bi-directional communication television receivers and data from a subscriber database accessible by the viewership analysis system. A differentiator model may then be trained using the viewership target model. The differentiator model may be applied to the addressable television receivers. Content may then be addressed to some of the addressable television receivers based on applying the differentiator model.

20 Claims, 7 Drawing Sheets

(51) Int. Cl.
*H04N 21/81* (2011.01)
*G06Q 30/02* (2012.01)
*H04N 21/466* (2011.01)

(52) U.S. Cl.
CPC . *H04N 21/25883* (2013.01); *H04N 21/25891* (2013.01); *H04N 21/2668* (2013.01); *H04N 21/4383* (2013.01); *H04N 21/4667* (2013.01); *H04N 21/6143* (2013.01); *H04N 21/6193* (2013.01); *H04N 21/812* (2013.01)

(58) Field of Classification Search
CPC ........... G06Q 30/0251; G06Q 30/0254; G06Q 30/0255; G06Q 30/0261
See application file for complete search history.

(56) References Cited

U.S. PATENT DOCUMENTS

| | | | |
|---|---|---|---|
| 2009/0259519 A1* | 10/2009 | Cronin | G06Q 30/02 705/7.29 |
| 2013/0326554 A1* | 12/2013 | Shkedi | H04N 21/812 725/34 |
| 2014/0109123 A1* | 4/2014 | Balakrishnan | H04N 21/44222 725/14 |
| 2016/0119665 A1* | 4/2016 | Grant | H04N 21/2668 725/35 |
| 2016/0165277 A1* | 6/2016 | Kirillov | H04N 21/251 725/14 |

* cited by examiner

TELEVISION PROGRAMMING DISTRIBUTION NETWORK WITH INTEGRATED DATA GATHERING, MODELING, FORECASTING, DELIVERY, AND MEASUREMENT

BACKGROUND

Television programming can be broadcast to locations using a variety of arrangements, including satellite television distribution networks, cable television distribution networks, over-the-air television distribution networks, and IP television distribution networks. Despite these networks being in place, to gather information about what specific demographic groups have viewed on television and predict viewership for future programming, typically metering devices are installed in homes or viewers are asked to maintain diaries of their viewing habits. Such arrangements are inefficient because they rely on viewers' ability and willingness to start and stop metering at the correct times in case of meters or accurately record recall previous days' viewership activities in case of diaries, which can lend itself to error and omission. Further, collection of data in such a fashion can be expensive and time consuming. Viewers may need to be compensated to provide incentive to record accurate viewership. To reduce viewer fatigue, the viewers that use meters or diaries may be rotated and rebalanced often. As a result, the sample size of viewers that can be accurately measured in this fashion can be limited. The demographic data from these viewers is sparse and because of the typical small sample size can miss out on marginal demographic signals.

SUMMARY

Various methods and systems are presented for using a television programming distribution network system. In some embodiments, a television programming distribution network system is present. The system may include a plurality of bi-directional communication television receivers. Each of such receives may include a plurality of tuners that receive television programming from a television service provider broadcast system of a television service provider and a communication interface that transmits viewership information to a viewership analysis system of the television service provider. The system may include the viewership analysis system that includes a subscriber database that relates physical addresses of structures at which the plurality of bi-directional communication television receivers are installed with identifiers of the bi-directional communication television receivers. The viewership analysis system may include a viewership modeling server system that includes one or more processors; and a memory communicatively coupled with and readable by the one or more processors and having stored therein processor-readable instructions. The instructions may cause the one or more processors to construct a viewership target model using the viewership information received from the plurality of bi-directional communication television receivers and data from the subscriber database. The instructions may cause the one or more processors to train a differentiator model using the viewership target model. The instructions may cause the one or more processors to apply the differentiator model to a plurality of addressable television receivers. The instructions may cause the one or more processors to distribute content to at least a subset of the plurality of addressable television receivers based on applying the differentiator model to the plurality of addressable television receivers.

Embodiments of such systems may include one or more of the following features: The viewership analysis system may include a communication interface that communicates with a demographic database, wherein the demographic database is distinct from the subscriber database and the demographic database relates demographic information with physical addresses of structures. The viewership modeling server system may be configured to construct the viewership target model comprises the viewership target model being constructed using demographic data from the demographic database. The viewership modeling server system may: identify a television program; rank the plurality of bi-directional communication television receivers based on an amount of time the television program was viewed with a defined time range using each of the plurality of bi-directional communication television receivers; and create the viewership target model to target bi-directional communication television receivers of the plurality of bi-directional communication television receivers that have the highest ranking based on the amount of time that the television program was viewed. The viewership modeling server system may: identify a television program; rank the plurality of bi-directional communication television receivers based on a number of times episodes of the television program were viewed with a defined time range using each of the plurality of bi-directional communication television receivers; and create the viewership target model to target bi-directional communication television receivers of the plurality of bi-directional communication television receivers that have the greatest number of times episodes of the television program were viewed. The information transmitted via the communication interface to the viewership monitoring server can include indications of television channels and durations for which the television channels were output for presentation. The demographic database may be maintained by a third party and the communication interface is configured to communicate via the Internet with the demographic database. The system can include a satellite-based television programming distribution network that broadcasts the television programming to the plurality of bi-directional communication television receivers.

BRIEF DESCRIPTION OF THE DRAWINGS

A further understanding of the nature and advantages of various embodiments may be realized by reference to the following figures. In the appended figures, similar components or features may have the same reference label.

DETAILED DESCRIPTION

Figure 1:
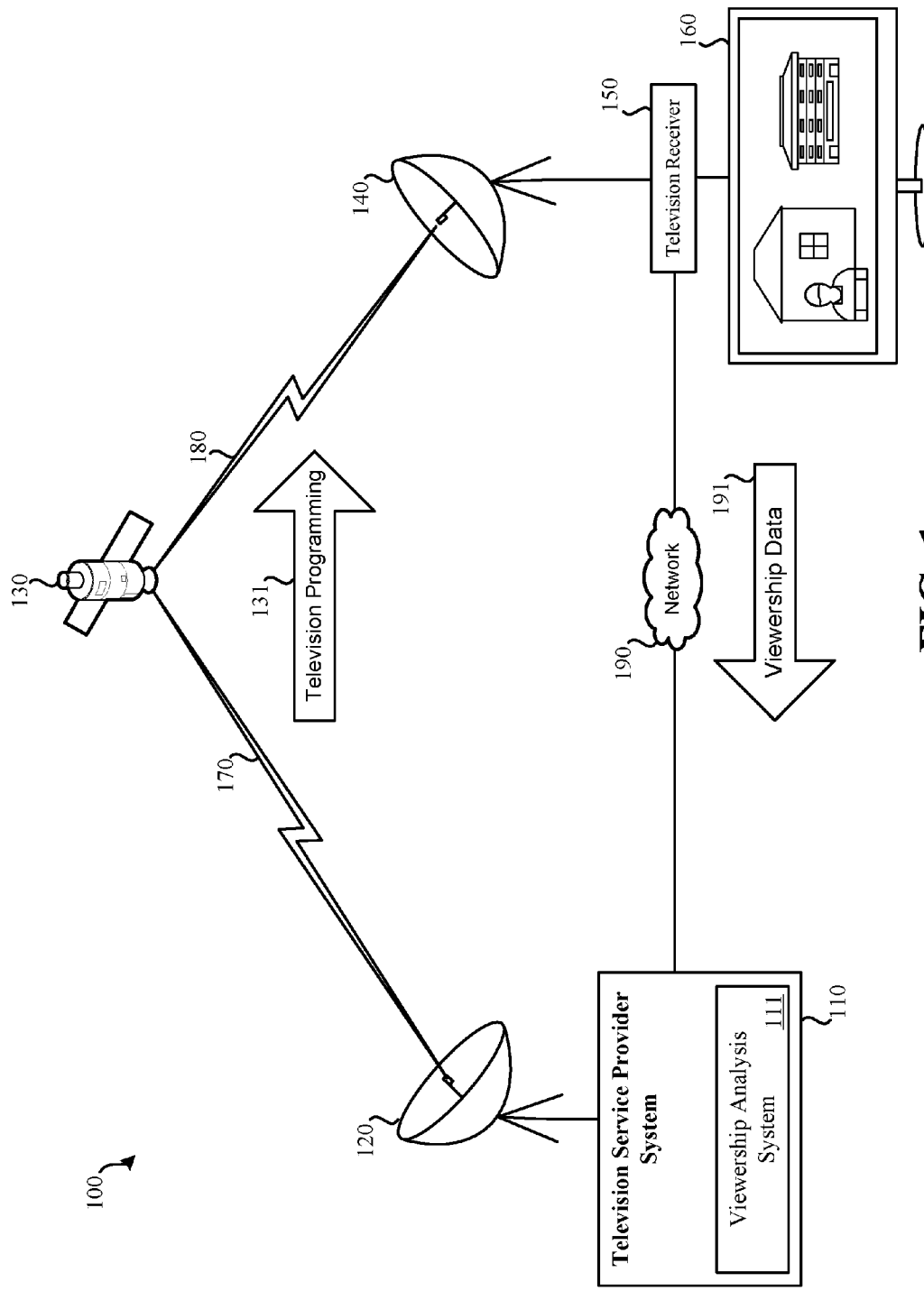
FIG. 1 illustrates an embodiment of a television programming distribution network that provides viewership data to a television service provider system.

Television programming distribution networks can communicate with television receivers, such as set top boxes (STBs), in multiple ways. Some television receivers are only capable of receiving broadcast content. Such content may be broadcast by a television service provider via a television programming distribution network to many television receivers, such as tens of thousands across a large geographic area. Other television receivers can be individually addressed and can receive broadcast television programming, but cannot transmit data back to the television service provider. A message intended for a specific addressable television receiver may be sent, such as via the television service provider's network, to the specific television receiver, but the television receiver cannot respond. Still other television receivers are capable of: being addressed, receiving broadcast television programming, and bidirectional communication with the television service provider. This category of television receiver can provide valuable information to the television service provider, such as information about what content the television receiver has output for viewing.

An analysis of viewership data obtained from television receivers that can perform bidirectional communication with the television service provider can be used to identify relationships between television viewers and the content that such viewers' watch. By analyzing the viewership data and determining a correlation between one or more characteristics of the viewership data and demographic information of the viewers, such a correlation can be applied to a larger population of television receivers (and viewers), such as viewers associated with television receivers that can be addressed but cannot perform bidirectional communication with the television service provider, viewers associated with television receivers that can only receive broadcast programming, or persons unassociated with a television receiver. The distribution of content to addressable television receivers can be targeted more effectively and, in some situations, a smaller amount of addressable content can be transmitted via a television service provider's distribution network while effectively targeting particular demographic groups of people.

For example, in a conventional arrangement, a commercial may be sent to a large number of television receivers since the viewers that use the television receivers cannot accurately be targeted; such advertisements can be referred to as broadcast advertisements or broadcast commercials. However, as detailed herein, by using the viewership targeting embodiments detailed herein, a single commercial or other form of content can be sent specifically to the intended television receiver by accurate targeting, which is referred to as an addressable advertisement. That is, addressing and sending a single well-targeted commercial to a television receiver (e.g., that is output for presentation three times) can be more effective than three different, less effectively targeted or untargeted commercials (that may each be output once). The well-targeted commercial, by virtue of being better targeted and expected to be more effective, can decrease the amount of targeted data that needs to be transmitted over the television programming distribution network, thus freeing bandwidth for other purposes.

Viewership data obtained from television receivers is indicative of programming that has been output for viewing by the television receivers and is, as such, a reliable indicator of what television programming has been viewed by occupants of residences at which the television receivers are located. Additionally, viewership data obtained from television receivers combined with information indicative of when and on which channel broadcast advertisements were broadcast is indicative of the specific advertising that has been output for viewing by the television receivers and can therefore be a reliable indicator of what advertisements have been viewed by occupants of residences at which the television receivers are located. The television service provider system can correlate this viewership information with other available information. The viewership information may include an identifier of the television receiver that can be linked with an address based on a billing or installation address associated with a user account of the television receiver. Based on the address, additional demographic data may be retrieved by the television service provider, such as from a third-party source. A viewership target model can be created that identifies a particular portion of the viewer population having bi-directional communication television receivers. Once this viewership target model has been created, a differentiation model can be used to distinguish between a control group, which is a random sampling of television viewers, and the particular viewer population identified by the viewership target model. This differentiation model can then be applied to a different population, such as a population associated with addressable television receivers, a population associated with non-addressable television receivers, or another population group (e.g., the US population, generally) to identify persons likely to match the viewership target model.

Content may be distributed to addressable and non-addressable television receivers based on such an arrangement. For example, television commercials or on-demand television programming may be addressed and transmitted to television receivers based on such a differentiation model having been created based on viewership data obtained from bi-directional communication television receivers. As such, the amount of content that is distributed to the television receivers may be decreased because the content is better targeted using a differentiation model. (For example, a television commercial for an advertiser may be distributed to a targeted population on whom the television commercial is likely to be effective and avoided from being distributed to television receivers associated with one or more viewers outside that population.) Additionally or alternatively, the targeting data, such as a population identified using the differentiation model, can be sold or transferred independently of content distribution. For example, a third party may, based on correlations identified using the viewership target model based on bi-directional television receivers, desire to acquire a differentiation model or results output from a differentiation model that identify a portion of the general population or a population of television viewers.

FIG. 1 illustrates an embodiment of a satellite television distribution system 100. Satellite television distribution system 100 may include: television service provider system 110, satellite transmitter equipment 120, satellite 130, satellite dish 140, television receiver 150, and television 160. Alternate embodiments of satellite television distribution system 100 may include fewer or greater numbers of components. While only one satellite dish 140, television receiver 150, and television 160 are illustrated, it should be understood that multiple (e.g., tens, thousands, millions) instances of such equipment may receive television signals from satellite 130.

Television service provider system 110 and satellite transmitter equipment 120 may be operated by a television service provider. A television service provider may distribute television channels, on-demand programming, television commercials programming information, and/or other services to viewers. Television service provider system 110 may receive feeds of one or more television channels from various sources. To distribute television channels to users, feeds of the television channels may be relayed to user equipment via one or more satellites via transponder streams. Satellite transmitter equipment 120 may be used to transmit a feed of one or more television channels from television service provider system 110 to one or more satellites such as satellite 130. Such satellite feeds may be unidirectional—user equipment may not be able to transmit information back to television service provider system 110 via satellite 130. As such, television programming 131 is illustrated as being transmitted from television service provider system 110 to television receiver 150 via satellite 130, but no return path via satellite 130 is present. While a single television service provider system 110 and satellite transmitter equipment 120 are illustrated as part of satellite television distribution system 100, it should be understood that multiple instances of transmitter equipment may be used, possibly scattered geographically to communicate with one or more satellites such as satellite 130. Such multiple instances of satellite transmitting equipment may communicate with the same or with different satellites. Different television channels and content may be transmitted to satellite 130 from different instances of transmitting equipment. For instance, a different satellite dish of transmitting equipment 120 may be used for communication with satellites in different orbital slots.

Satellite 130 may be configured to receive signals, such as streams of television channels, from one or more satellite uplinks such as satellite transmitter equipment 120. Satellite 130 may relay received signals from satellite transmitter equipment 120 (and/or other satellite transmitter equipment) to multiple instances of user equipment via transponder streams. Different frequencies may be used for uplink signals 170 from downlink, transponder streams 180. Multiple satellites may be used to relay television channels from television service provider system 110 to satellite dish 140. Different television channels may be carried using different satellites. Different television channels may also be carried using different transponders of the same satellite; thus, such television channels may be transmitted at different frequencies and/or different frequency ranges. As an example, a first and second television channel may be carried on a first transponder of satellite 130. A third, fourth, and fifth television channel may be carried using a different satellite or a different transponder of the same satellite relaying the transponder stream at a different frequency. A transponder stream transmitted by a particular transponder of a particular satellite may include a finite number of television channels, such as seven. Accordingly, if many television channels are to be made available for viewing and recording, multiple transponder streams may be necessary to transmit all of the television channels to the instances of user equipment.

Satellite dish 140 may be a piece of user equipment that is used to receive transponder streams from one or more satellites, such as satellites 130. Satellite dish 140 may be provided to a user for use on a subscription basis to receive television channels provided by the television service provider system 110, satellite uplink 120, and/or satellite 130. Satellite dish 140 may be configured to receive transponder streams from multiple satellites and/or multiple transponders of the same satellite. Satellite dish 140 may be configured to receive television channels via transponder streams on multiple frequencies. Based on the characteristics of television receiver 150 and/or satellite dish 140, it may only be possible to capture transponder streams from a limited number of transponders concurrently. For example, a tuner of television receiver 150 may only be able to tune to a single transponder stream from a transponder of a single satellite at a time.

Figure 6:
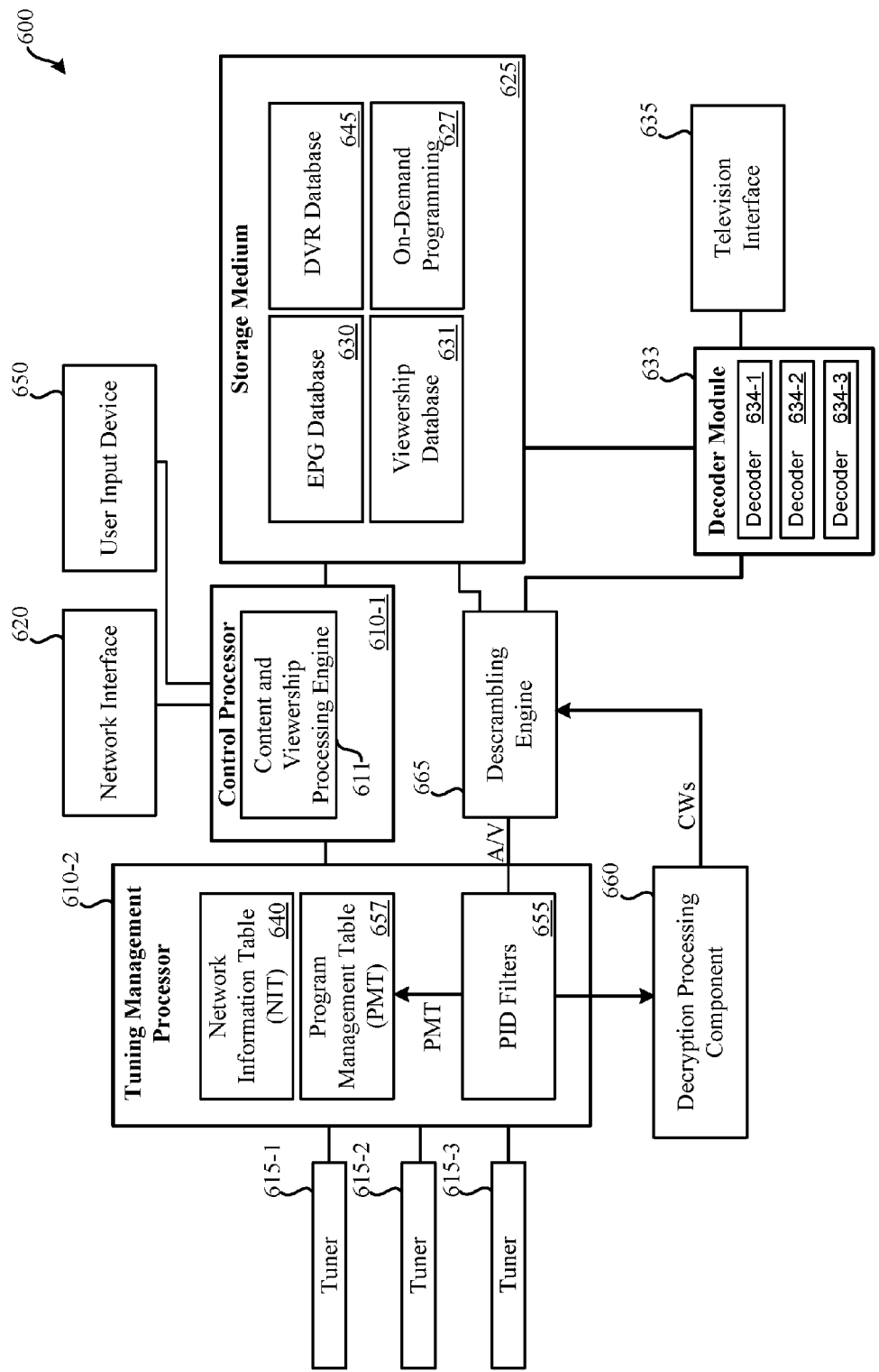
FIG. 6 illustrates an embodiment of a television receiver that is capable of bidirectional communication with a television service provider system and can provide viewership data.

In communication with satellite dish 140 may be one or more sets of receiving equipment. Receiving equipment may be configured to decode signals received from satellites 130 via satellite dish 140 for display on a display or presentation device, such as television 160. A television receiver may be incorporated as part of a television or may be part of a separate device, commonly referred to as an STB. A television receiver may include a satellite tuner configured to receive television channels via a satellite. Television receiver 150 may decode signals received via satellite dish 140 and provide an output to television 160. FIG. 6 provides additional detail of a television receiver.

Television 160 may be used to present video and/or audio decoded by television receiver 150. Television receiver 150 may also output a display of one or more interfaces to television 160, such as an electronic programming guide (EPG). In some embodiments, a display device other than a television may be used, such as a monitor.

Uplink signal 170 represents a signal between satellite uplink 120 and satellite 130. Uplink signal 170 may contain streams of one or more different television channels. For example, uplink signal 170 may contain a certain group of television channels, while another uplink signal contains a different grouping of television channels. Each of these television channels may be scrambled such that unauthorized persons are prevented from accessing the television channels.

Transponder stream 180 represents a signal between satellite 130 and satellite dish 140. Transponder stream 180 may contain one or more different television channels, which may be at least partially scrambled. For example, transponder stream 180 may include a first transponder stream containing a first group of television channels, while another transponder stream may include a different group of television channels. A satellite may transmit multiple transponder streams to user equipment. For example, a typical satellite may relay 32 transponder streams via corresponding transponders to user equipment. Further, spot beams are possible. For example, a satellite may be able to transmit a transponder stream to a particular geographic region (e.g., to distribute local television channels to the relevant market). Different television channels may be transmitted using the same frequency of the transponder stream to a different geographic region.

FIG. 1 illustrates transponder stream 180 being received by satellite dish 140. For a first group of television channels, satellite dish 140 may receive a first transponder stream and may receive a second transponder stream for a second group of channels. Television receiver 150 may decode the received transponder stream. As such, depending on which television channel(s) are desired, a transponder stream from a different satellite (or a different transponder of the same satellite) may be accessed and decoded by television receiver 150. Further, while two satellites are present in satellite television distribution system 100, in other embodiments greater or fewer numbers of satellites may be present for receiving and transmitting transponder streams to user equipment.

Television receivers may be of various types, including: 1) non-addressable and only capable of receiving broadcast content; 2) addressable and capable of receiving broadcast content; and 3) capable of bi-direction communication with a television service provider and capable of receiving broadcast content). An addressable television receiver refers to a television receiver that can be addressed distinctly from other television receivers. For instance, if television receiver 150 is addressable, by transmitting a message via satellite 130 that contains an identifier of television receiver 150, the message may be ignored by other STBs and only processed by television receiver 150. Television receivers of the second category may not be able to transmit information back to the television service provider. The communication path to television receiver 150 via satellite 130 may be unidirectional and, in some instances a connection with network 190 may not be available or the television receiver may not have the appropriate hardware or software to connect with network 190. In various embodiments of system 100, various types of STBs or, more generally, television receivers, may be used that fall into at least two or all three of the described types. For example, in a possible embodiment of system 100, millions of television receivers are capable of bidirectional communication and millions of additional television receivers may be addressable. Various embodiments of television receivers are detailed in relation to television receiver 600 of FIG. 6.

Network 190 may serve as a secondary communication channel between television service provider system 110 and television receiver 150 and can allow television receivers of the third category to transmit information, such as viewership data 191, back to television service provider system 110. Via such a secondary communication channel, bidirectional exchange of data may occur. As such, data may be transmitted to television service provider system 110 via network 190. The connection between network 190 and television receiver 150 may not be available (e.g., television receiver 150 may not have such communication capabilities, television receiver 150 may have such capabilities but may not be connected with network 190). For example, even if a STB is capable of communicating using network 190, communication using network 190 may require that the user has an active account with an internet service provider. Accordingly, some STBs may only be able to receive data from satellites 130 via receiving equipment such as satellite dish 140. In other situations, while a user may have an active ISP account, such as via a fiber, cable, or DSL internet connection, equipment failure may occur. For instance, a router through which television receiver 150 connects to network 190 may fail or be in need of resetting. Network 190 may be or include the Internet.

Viewership data 191 may represent indications of television programming (e.g., broadcast television programming, such as a television channel, on-demand content, recorded television programming) that has been viewed using the television receiver. Viewership data 191 may also include time information, such as a duration for which the television programming was viewed. Viewership data 191 may also include an identifier of the television receiver 150. This identifier may distinguish television receiver 150 from other television receivers that are part of system 100.

System 100 can include a viewership analysis system 210. Viewership analysis system can be incorporated as part of television service provider system 110 and may use one or more computer server systems. Further detail regarding viewership analysis system 111 is provided in relation to FIG. 2.

FIG. 1 illustrates an example of a satellite-based television channel distribution system. It should be understood that at least some of the aspects of such a system may be similar to a cable television distribution system. For example, in a cable television system, rather than using satellite transponders, multiple RF channels on a cable may be used to transmit streams of television channels. As such, aspects detailed herein may be applicable to cable television distribution systems. Other forms of television distribution networks include broadcast over-the-air systems and IP-based distribution systems.

Figure 2:
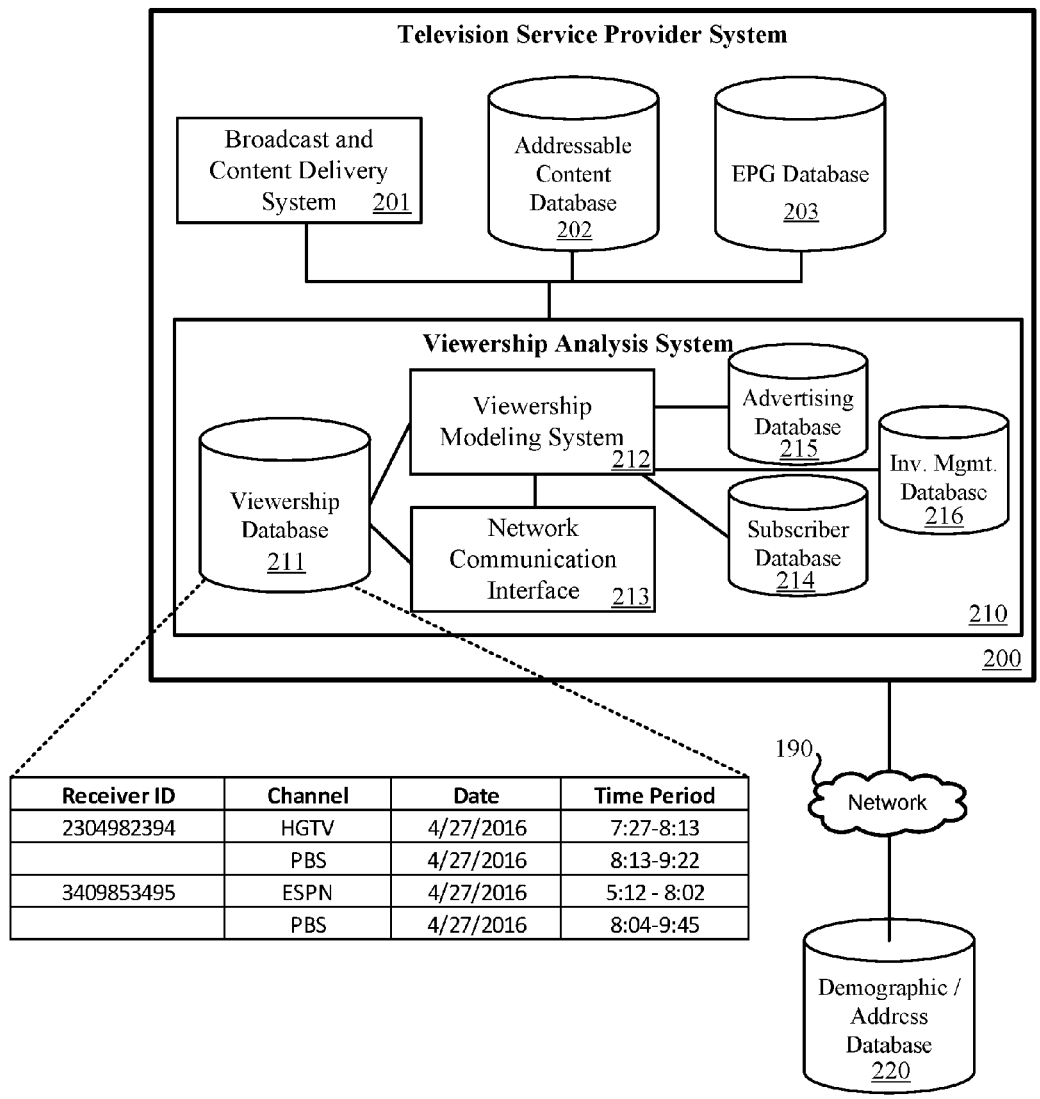
FIG. 2 illustrates an embodiment of a television service provider system.

FIG. 2 illustrates an embodiment of a television service provider system 200. Television service provider system 200 may include: broadcast and content delivery system 201, addressable content 202, EPG database 203, and viewership analysis system 210. Television service provider system 200 may represent an embodiment of television service provider system 110 of FIG. 1. Broadcast and content delivery system 201 may serve to deliver broadcast and addressed content to television receivers via television provider distribution network 100 of FIG. 1. Addressed content refers to content that is addressed to one or more particular television receivers to the exclusion of other television receivers. Addressed content may only be stored and made available for output by television receivers to which the content was addressed; other television receivers may ignore the addressed message containing the content and refrain from processing or storing it. Broadcast content may be transmitted to all television receivers and, assuming the television receiver has the proper permissions, may output live and/or store the broadcast content. Broadcast and content delivery system 201 may be used to distribute content including broadcast television channels, on-demand content, addressed commercials, and/or other content.

Addressable content 202 represents a database of content that is to be distributed to particular television receivers. Addressable content 202 can include television programming and commercials. For example, a commercial from addressable content 202 may be distributed to addressable television receivers via broadcast and content delivery system 201 in response to viewership analysis system 210 determining a population of addressable television receivers to which the commercial should be delivered. That is, viewership analysis system 210 may be used to identify addressable television receivers which are associated with viewers that are to be targeted and have the commercial delivered for playback. Such a television commercial may be inserted within a commercial break such that the targeted commercial is presented during a broadcast television program, and possibly in conjunction with one or more broadcast television commercials.

Electronic programming guide (EPG) database 203 refers to a database that identifies what content is presented on various television channels at various times. Viewership data that is received from a bidirectional communication television receiver may indicate a particular television channel and time period for which the television channel is viewed. This data may be compared with entries within EPG database 203 to determine the particular instances of content viewed or recorded using the television receiver. Therefore, it may be possible to determine particular content that has been viewed or recorded using the television receiver without the television receiver transmitting an indication of the content; rather, an indication of a television channel in the time period may be transmitted. In other embodiments, bidirectional communication television receivers may transmit identifiers that indicate particular instances of content that have been viewed or recorded. Such identifiers may be associated with content as indicated in EPG database 203. That is, an identifier may correspond to a particular instance of television programming which can be looked up using EPG database 203.

Viewership analysis system 210, which can represent viewership analysis system 111 of FIG. 1, can include multiple components, including: viewership database 211, viewership modeling system 212, network communication interface 213, subscriber database 214, and advertising database 215. Viewership database 211 may be populated with entries from bidirectional communication television receivers. Bidirectional communication television receivers may transmit viewership data to viewership database 211 via network communication interface 213 and network 190 (or some other communication channel). Some bidirectional communication television receivers may use the Internet to communicate with network communication interface 213. Some television receivers may pass viewership data to viewership database 211 via a direct communication link, such as a dial-up connection established between a communication interface of viewership analysis system 210 and the bidirectional communication television receiver. In satellite-based embodiments of television programming distribution networks, the satellite-based distribution network may only be used for distributing data to television receivers and an alternate communication link may be used for transmitted data to viewership analysis system 210. With other types of television programming distribution networks, such as cable-based television distribution networks and IP-based distribution networks, the same network used for distributing television programming may be used for providing viewership information to viewership analysis system 210.

Viewership database 211 may be populated with entries that specify: an identifier of the television receiver, an indication of a television channel (or other content) was viewed or recorded, a date, and a time period during which the television channel was viewed. Additional information may also be contained within viewership database 211, such as an indication of whether the content that was viewed was previously recorded, was watched live, or was on-demand content. Data stored in viewership database 211 may be processed and filtered. For instance, if content was watched for less than a period of time, such as for less than three minutes, the associated entry in viewership database 211 may be discarded (e.g., to avoid entries related to a user flipping through channels).

Viewership modeling system 212 may construct various types of viewership models using data from viewership database 211. Since the data stored by viewership database 211 is gathered exclusively from bidirectional communication television receivers, the viewership models created by viewership modeling system 212 are based on viewership data captured from bidirectional communication television receivers that are providing viewership information to viewership database 211 via network communication interface 213. Additional detail regarding viewership modeling system 212 is provided in relation to viewership modeling system 300 of FIG. 3.

Subscriber database 214 may be stored locally by viewership analysis system or otherwise locally stored by television service provider system 200. Subscriber database 214 may store identifiers of television receivers in association with subscriber account information. Such subscriber account information may include a name of the primary account holder (e.g., the person who is billed a subscription fee) and an address at which the primary account holder is billed or at which the television receiver was installed. In some situations, the television service provider operating television service provider system 200 is responsible for coordinating installation of television receivers and associated equipment, such as a satellite dish. As such, the television service provider is aware of an address at which the television receiver is installed. This name and address information may be linked with viewership data stored in viewership database 211 based on an identifier of the television receiver.

Demographic and address database 220 may be externally accessed via network 190 by viewership analysis system 210. Demographic and address database 220 may be maintained by a third-party provider. In other embodiments, demographic and address database 220 may be maintained and stored locally by viewership analysis system 210 or, more generally, television service provider system 200. Demographic and address database 220 may serve to relate demographic data with particular addresses and/or persons' names. Demographic and address database 220 may include various demographic information that is related to occupants of particular addresses, such as: income (or income range), home value, age (or age range) of occupant(s), gender of occupant(s), credit rating of occupant(s), number of credit lines and credit limit of occupant(s), political affiliation of occupant(s), interests of occupant(s), hobbies of occupant(s), organization memberships of occupant(s) (e.g., AARP, NRA, AAA, etc.), geography, race of occupant(s), ethnicity of occupant(s), etc. Viewership data from viewership database 221, via name and address information of subscriber database 214, may be linked with data from demographic and address database 220.

Advertising database 215 may maintain a log indicating: an indication of a specific commercial; the start and/or end time of broadcast, and the television channel on which the commercial was transmitted. Advertising database 215 may be maintained internally by viewership analysis system 210 or may be maintained externally by a third party (to which access may be acquired). Such data can be used for modelling against specific viewership events, such as determining a group of viewers that were exposed to a specific advertiser's advertisement that was broadcast on a particular television channel at a specific date and time. For example, based on viewership data obtained from a television receiver, if it is known that a viewer was watching CBS from 4:05-4:25 PM on a particular day, the broadcast commercials that were broadcast during that time period can be determined by accessing advertising database 215.

Figure 3:
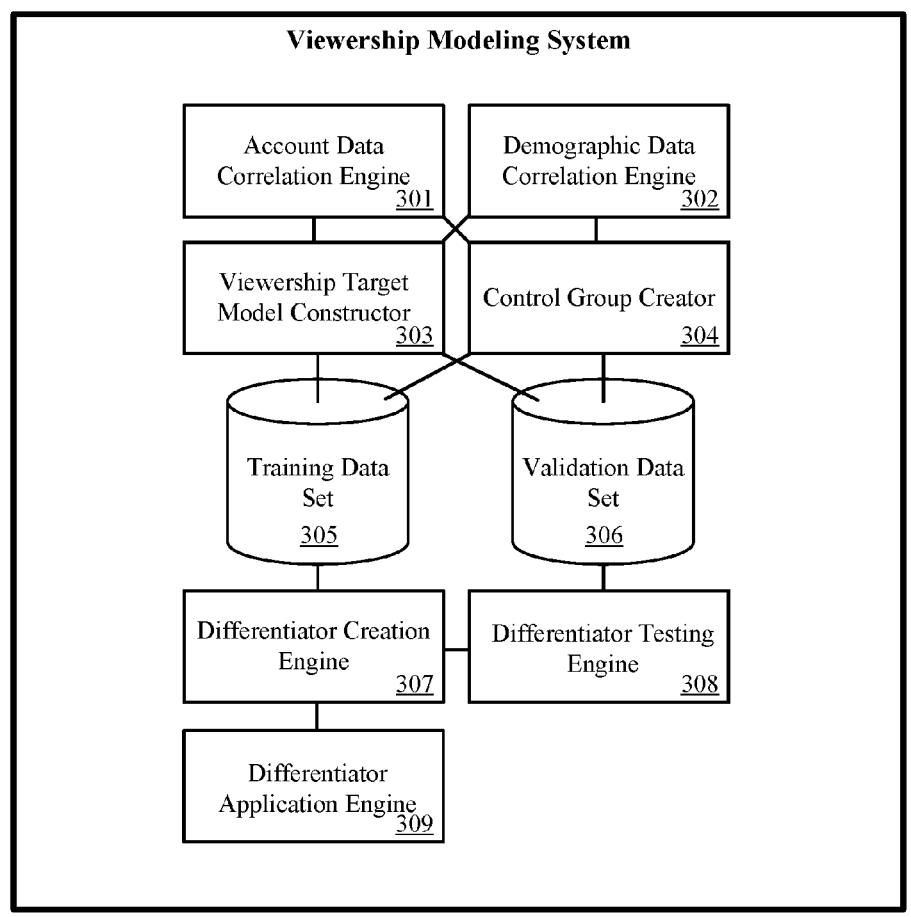
FIG. 3 illustrates an embodiment of a viewership analysis system that can be incorporated as part of a television service provider system.

FIG. 3 illustrates an embodiment of a viewership modeling system 300 that can be incorporated as part of a television service provider system. Viewership modeling system 300 can represent viewership modeling system 212 of FIG. 2. Viewership modeling system 300 can include: account data correlation engine 301, demographic data correlation engine 302, viewership target model constructor 303, control group creator 304, training data set 305, validation data set 306, differentiator creation engine 307, differentiator testing engine 308, and differentiator application engine 309. Each of the components of viewership modeling system 300 may be implemented using one or more computer systems, such as the computer system detailed in relation to FIG. 7.

Account data correlation engine 301 may serve to identify account data from a subscriber database, such as subscriber database 214, that corresponds with viewership data from a viewership database 211. A television receiver identifier may be used as a key to determine entries from viewership database 211 that correspond with subscribers and addresses stored in subscriber database 214. Demographic data correlation engine 302 may serve to identify demographic data within a demographic and address database, such as demographic and address database 220. Based on an address or name from subscriber database 214, demographic data for the location or person(s) can be retrieved from demographic/address database 220. Using subscriber database 214 to identify persons and locations associated with viewership data from viewership database 211 allows viewership data from viewership database 211 to be linked with demographic data from demographic and address database 220 by account data correlation engine 301.

Viewership modeling system 300 may be used to construct multiple types of viewership target models to target television viewers with particular viewing characteristics. For example, an advertiser may desire to target television viewers that have watched a particular television program. For instance, the advertiser, who may be advertising a type of truck, may desire to target delivery of an advertisement to viewers of a weekly television program called "Truck Tuners!" Viewership target model constructor may construct viewership target models such as: intensity-based viewership targets, repetitive-based viewership target models, and multilevel viewership target models.

An intensity-based viewership target model can be created using viewership target model constructor 303 by choosing a particular television show (or other type of content), television show episode, television channel, particular time of day, or any other particular characteristic of content viewing that has been identified as desired to be targeted. Using data from viewership database 211, it can be determined which television receivers were used to view and/or record the content identified as desired to be targeted. Of these television receivers, the television receivers may be ranked based on an amount of time that each television receiver output the content identified as desired to be targeted. For instance, the greater number of seconds that a particular television receiver was used to output the content identified as desired to be targeted, the higher the rank of the television receiver. Therefore, the television receiver which was used to view the content desired to be targeted for the longest duration may be the highest ranked of the television receivers. Of the ranked television receivers, a top selected percentage of the television receivers may be selected for the model. For example, between the top 5% and 50% (or any other percentage) of the ranked television receivers may be selected for targeting as part of the intensity-based viewership target model. Therefore, television receivers and the television receivers' associated viewers that are ranked as having viewed a particular piece of content for the longest time will be included in the intensity-based viewership target model.

A repetition-based viewership target model can be created using viewership target model constructor 303 by choosing a particular television show series (or other type of content), that has been identified as desired to be targeted (e.g., by an advertiser). Using data from viewership database 211, it can be determined which television receivers were used to view and/or record the content identified as desired to be targeted. Of these television receivers, the television receivers may be ranked based on a number of times that each television receiver output the content identified as desired to be targeted. For instance, the greater number of episodes of a particular television series desired to be targeted that a particular television receiver was used to output, the higher the rank of the television receiver. Therefore, the television receiver which was used to view the targeted content the most number of times would be the highest ranked of the television receivers. Of the ranked television receivers, a top selected percentage of the television receivers may be selected for the model. For example, between the top 5% and 50% (or any other percentage) of the ranked television receivers may be selected for targeting as part of the repetition-based viewership target model. Therefore, television receivers and the television receivers' associated viewers that are ranked as having viewed a particular series of content the most number of times will be included in the repetition-based viewership target model.

A multi-level viewership target model can be created using viewership target model constructor 303 by choosing a particular television show (or other type of content), television show episode, television channel, particular time of day, or any other particular characteristic of content viewing that has been identified as desired to be targeted and creating two or more groupings. Analysis may be performed based on a length of time that a piece of content was viewed (intensity-based) or a number of times content or an episode of content was viewed (repetition-based). Each created group may represent different "levels" of viewers. For instance, an advertiser may wish to target non-heavy viewers, such as those who have only viewed a handful of episodes of a particular series (but have not viewed the entire series). Using data from viewership database 211, it can be determined which television receivers were used to view or record the content identified as desired to be targeted. Of these television receivers, the television receivers may be grouped based on an amount of time or number of times that each television receiver output the content identified as desired to be targeted into multiple "buckets." For example, if a repetition-based model is being used, a first group may be created for television receivers that have been used to view 0-2 episodes, a second group for 3-9 episodes, and a third group for 10 or more episodes. One or more than one of these buckets may be selected for inclusion in the model. Therefore, television receivers and the television receivers' associated viewers that are part of the desired bucket or group will be included in the intensity-based viewership target model.

The above examples represent three possible types of viewership target models that can be created. It should be understood that viewership target model constructor 303 can also be used to create other types of viewership target models. Whichever model type used by viewership target model constructor 303, the resulting viewership target model includes a population of television receivers that matches one or more desired viewership characteristics. This population used to create the viewership target model includes only television receivers that have provided viewership data, and, thus, represent bi-directional communication television receivers. These television receivers, using data from account data correlation engine 301 and demographic data correlation engine 302, are associated with address and demographic information.

Control group creator 304 creates a control group of television receivers. These television receivers are bidirectional communication television receivers that provided viewership data to the television service provider. Control group creator 304 creates a random group of television receivers. Using data from account data correlation engine 301 and demographic data correlation engine 302, the control group of television receivers is also associated with address and demographic information.

Two sets of data are then constructed by viewership target model constructor 303 and control group creator 304: training data set 305 and validation data set 306. Training data set 305 includes a viewership target model data set and a control data set. The viewership target model data set represents a portion (e.g., a first half) of the viewership target model created by the viewership target model constructor. The control data set represents a portion (e.g., a first half) of the control group of television receivers created by control group creator 304. Validation data set 306 includes a second viewership target model data set and a second control data set. The second viewership target model data set represents a second portion (e.g., a second half) of the viewership target model created by the viewership target model constructor. The second control data set represents a second portion (e.g., a second half) of the control group of television receivers created by control group creator 304.

Differentiator creation engine 307 can employ various machine learning algorithms based on differences in the demographic data between the viewership target model data set and the control data set of training data set 305. That is, training data set 305 is used to train a machine learning algorithm to distinguish between the control data set of training data set 305 and the viewership target model of training data set 305. For instance, stochastic gradient boosted decision trees may be used as the machine learning algorithm. As other examples, random forest, decision trees, linear regression, elastic net, or some other form of machine learning algorithm may be used.

Once differentiator creation engine 307 has trained a machine learning algorithm to create a differentiation model, this differentiation model may be used by differentiator testing engine 308 on validation data set 306. Applying the trained differentiation model to validation data set 306 using differentiator testing engine 308 may serve to test the efficacy of the created differentiation model. That is, it can be assessed how accurate the differentiation model is at differentiating the viewership target model from the control group since viewership, address, and demographic data are available for each entry present within validation data set 306.

If the differentiator model created by differentiation creation engine 307 is determined to be sufficiently accurate, differentiator application engine 309 may apply the differentiator model to another population, such as viewers associated with addressable television receivers, non-addressable television receivers, or a population of persons unassociated with television receivers. For these populations that the differentiator model is to be applied to, demographic data, and possibly address data, may be acquired but viewership data is unavailable. By applying the differentiator model to this population and the associated demographic characteristics, it can be assessed which persons or television receivers are likely to correspond to the viewership target model. These persons (and/or their television receivers) can then be provided with particular content based on being identified by the differentiator model as matching the viewership target model. As an example, if the population includes addressable television receivers, addressable television receivers that correspond with viewers identified as likely matching the viewership target model according to the differentiator model may be transmitted a particular commercial or other piece of content to be output to viewers. Since these viewers have been selected for receiving the targeted content using a differentiator model created based on viewership data, there is a strong likelihood that the content will be relevant and well-targeted to the viewers. As another example, the population may include persons not necessarily related to television receivers but for which demographic data is available, such as the population of the United States as a whole. Since the differentiator model uses demographic data to identify likely members of the viewership target model, the differentiator model may be applied to the U.S. population to determine which members of the population are likely to conform to the viewership target model.

Figure 4:
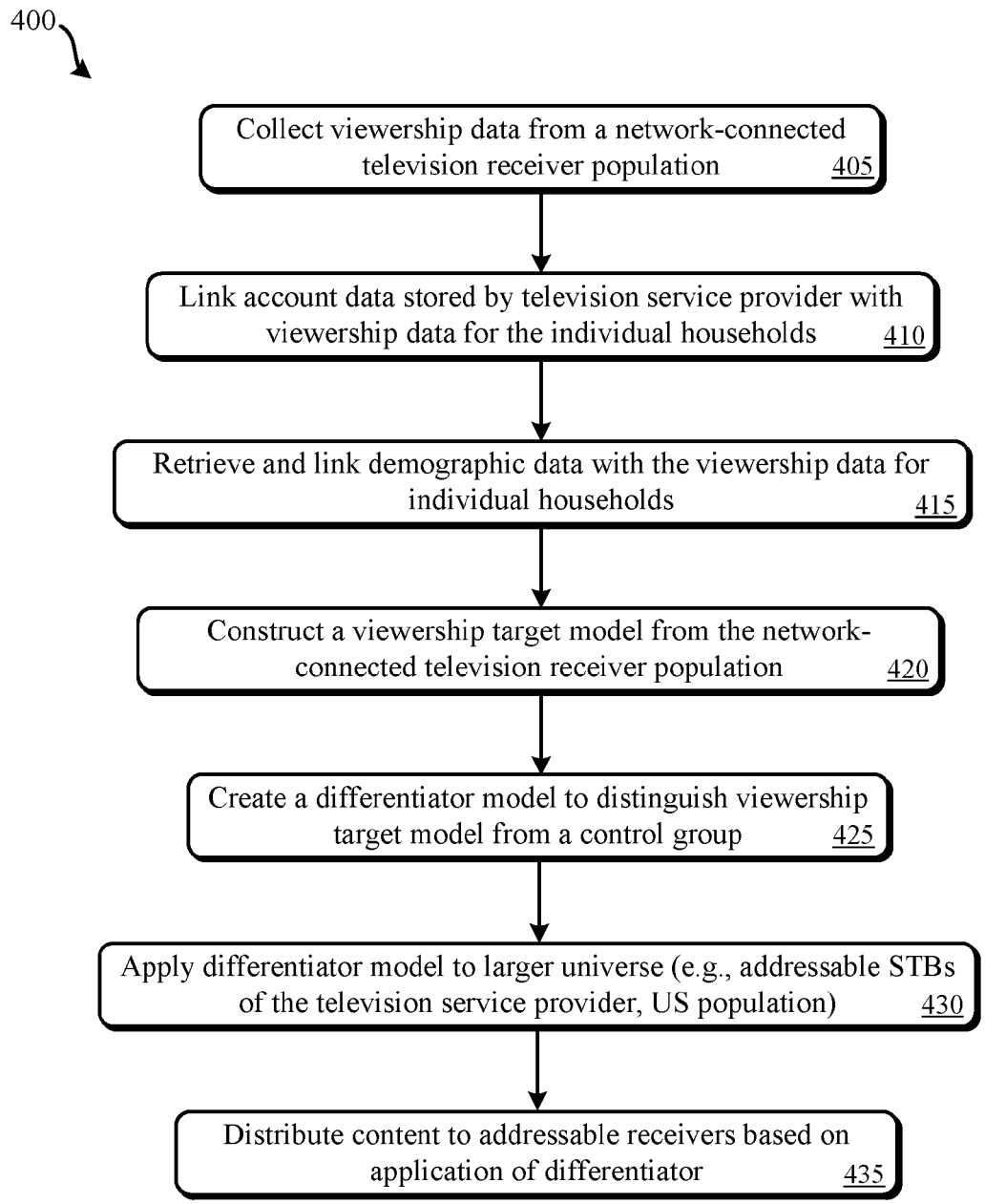
FIG. 4 illustrates an embodiment of a method for using a television programming distribution network with integrated predictive data gathering for distributing content.

Various methods may be performed using the systems detailed in relation to FIGS. 1 through 3. FIG. 4 illustrates an embodiment of a method 400 for using a television programming distribution network with integrated predictive data gathering for distributing content. Method 400 may be performed using viewership modeling system 300 of FIG. 3, which can function as part of television service provider system 200 of FIG. 2, which, in turn, can be used to distribute television programming to television receivers via system 100 of FIG. 1. Method 400 may also be performed by systems that are arranged differently than in FIGS. 1-3. For example, a viewership modeling system similar to FIG. 3 may be operated by a system that is distinct from a television service provider system. In such an arrangement, viewership data may be obtained from a television service provider or another source.

At block 405, viewership data from multiple network-connected bidirectional communication television receivers may be collected by a television service provider's system. Block 405 may be performed using a network communication interface of a viewership analysis system. A viewership database may be populated with indications of: a television receiver identifier, a television channel (or other form of content) viewed, and a date/time range of the viewing.

At block 410, account data stored by the television service provider may be linked with the viewership data collected at block 405. The account data may indicate correspondence between a television receiver identifier, and installation or billing address, and a primary account holder. At block 415, based on the installation or billing address and/or the identity of the primary account holder, demographic data may be linked with the viewership data for individual persons or households. As such, following block 415, viewership data, address data, and demographic data may be related together such that viewership data from a particular television receiver is linked with demographic data associated with the likely viewers who performed such television viewing via the television receiver.

At block 420, a viewership target model may be constructed from the bidirectional communication television receiver population for which viewership data has been received and for which account data and demographic data has been retrieved and linked at blocks 410 and 450. The viewership target model may be created to target specific content viewing patterns such as those detailed in relation to the intensity-based viewership models, repetition-based viewership models, and multilevel viewership models previously detailed. For instance, the viewership target model constructed at block 420 may be targeted to viewers associated with television receivers who have watched the most New Yankee Workshop episodes within a particular time period (e.g., the last 3 months). Another example could be the viewership target model being constructed at block 420 to target viewers associated with television receivers through which the most minutes of "The Bourne Identity" was viewed.

At block 425, a differentiator model may be created to distinguish the viewership target model created at block 420 from other viewership data, such as that of the control group. The differentiator model created at block 425 may be created as detailed in relation to differentiator creation engine 307 of FIG. 3. At block 430, the differentiator model created at block 425 may be applied to another (e.g., addressable) population of television receivers and associated viewers or some other population. This population may have each of its members associated with demographic data. As such, by applying the differentiator model to this population having demographic data (of the same categories retrieved and linked at block 415), the differentiator model can determine which members of the population are likely to conform to the viewership target model constructed at block 420.

At block 435, content may be distributed, such as to addressable receivers, based on the application of the differentiator model at block 430. Addressable television receivers determined to be associated with viewers who likely conform to the viewership target model based on application of the differentiator model at block 430 may be selected to receive particular content. This content may be distributed via the television service provider's network and may be addressed specifically to television receivers identified by applying the differentiator model of block 430. Therefore, for example, use of method 400 may result in content being more accurately distributed and allowing for a decrease in the amount of addressed content being sent to addressable television receivers because such content is more accurately targeted. That is, an advertiser may be willing to have an advertisement distributed to a smaller population of television receivers and associated viewers since the advertiser is aware that the advertisement is more accurately being targeted to a particular desired target audience.

Figure 5:
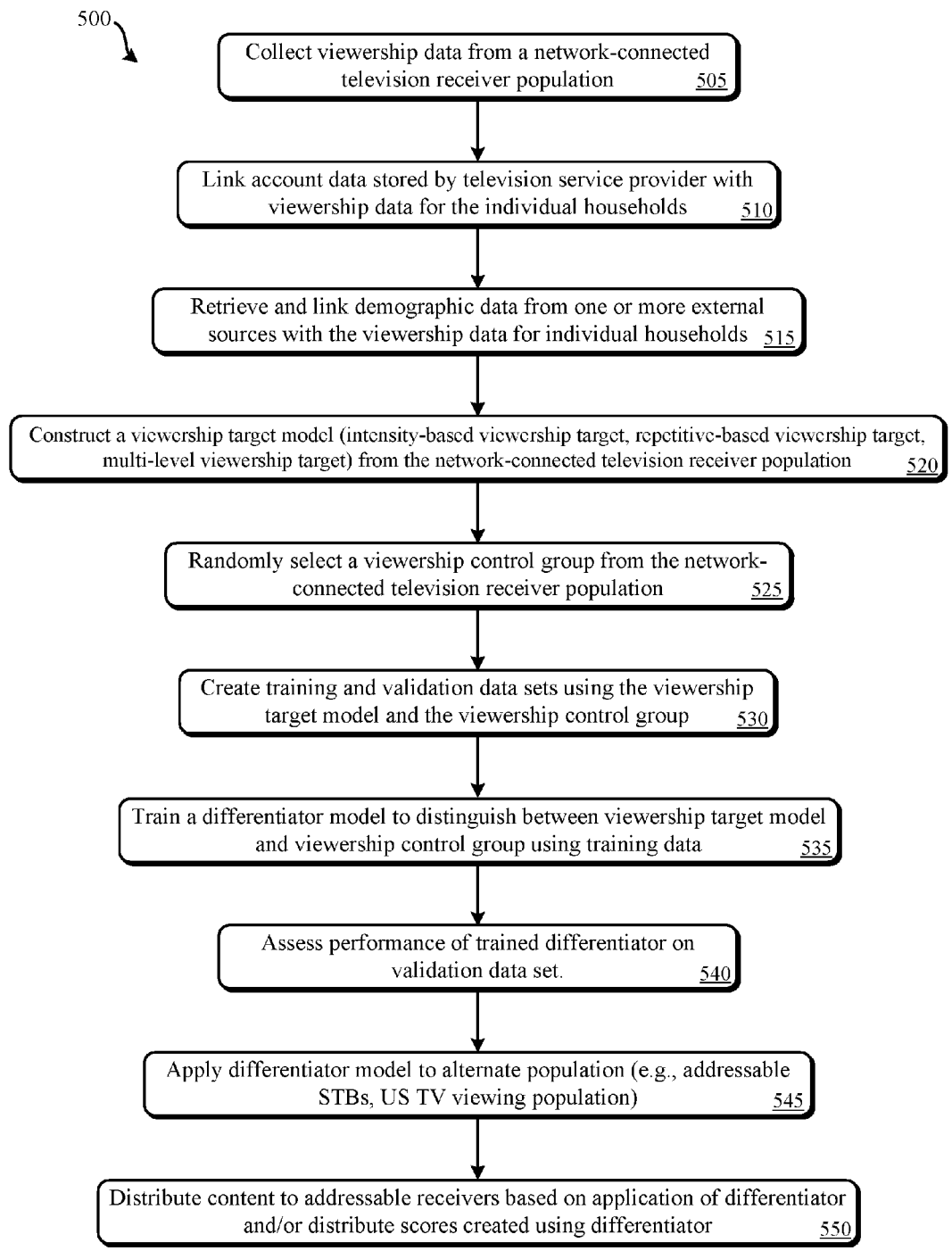
FIG. 5 illustrates another embodiment of a method for using a television programming distribution network with integrated predictive data gathering for distributing content.

FIG. 5 illustrates another embodiment of a method for using a television programming distribution network with integrated predictive data gathering for distributing content. Method 500 may be performed using viewership modeling system 300 of FIG. 3, which can function as part of television service provider system 200 of FIG. 2, which, in turn, can be used to distribute television programming to television receivers via system 100 of FIG. 1. Method 500 may also be performed by systems that are arranged differently than in FIGS. 1-3. For example, a viewership modeling system similar to FIG. 3 may be operated by a system that is distinct from a television service provider system. In such an arrangement, viewership data may be obtained from a television service provider or another source. Method 500 can represent a more detailed embodiment of method 400 of FIG. 4.

At block 505, viewership data from multiple network-connected bidirectional communication television receivers may be collected by a television service provider's system. Block 405 may be performed using a network communication interface of a viewership analysis system. A viewership database may be populated with indications of: a television receiver identifier, a television channel (or other form of content) viewed, and a date/time range of the viewing.

At block 510, account data stored by the television service provider may be linked with the viewership data collected at block 505. The account data may indicate correspondence between a television receiver's identifier, and installation or billing address, and a primary account holder. At block 515, based on the installation or billing address and/or the identity of the primary account holder, demographic data may be linked with the viewership data for individual persons or households. As such, following block 515, viewership data, address data, and demographic data may be related together such that viewership data from a particular television receiver is linked with demographic data associated with the likely viewers who performed such television viewing via the television receiver.

At block 520, a viewership target model may be constructed from the bidirectional communication television receiver population for which viewership data has been received and for which account data and demographic data has been retrieved and linked at blocks 510 and 515. The viewership target model may be created to target specific content viewing patterns such as those detailed in relation to the intensity-based viewership models, repetition-based viewership models, and multilevel viewership models previously detailed.

At block 525, a viewership control group may be randomly selected from the bidirectional communication network connected television receiver population. This control group may also have associated account, address, and demographic information. Therefore, the viewership control data may represent a random cross-section of the television receiver population that has provided viewership data to the television service provider.

At block 530, training and validation sets may be trained using the viewership target model of block 520 and the viewership control of block 525. The training set may include two distinct groups of data: a first portion of the viewership control group and a first portion of the viewership target model. The validation data set may also include two distinct groups of data: a second portion of the viewership control group and a second portion of the viewership target model.

At block 535, a differentiator model may be trained using the training data set to distinguish the first portion of the viewership target model from the first portion of the control group. The differentiator model created at block 535 may be created as detailed in relation to differentiator creation engine 307 of FIG. 3. At block 540, the differentiator model created at block 425 may be applied to the validation set. By applying the differentiator model to the validation set, the differentiator's efficacy in differentiating the second portion of the viewership target model from the second portion of the control group can be assessed. It is possible to assess the efficacy of the differentiator model because viewership data is stored for the second portions of the viewership target model and control group.

At block 545, the differentiator model trained at block 525 may be applied to another (e.g., addressable) population of television receivers and associated viewers or some other population. This population may have each of its members associated with demographic data. As such, by applying the differentiator model to this population having demographic data (of the same categories retrieved and linked at block 515), the differentiator model can determine which members of the population are likely to conform to the viewership target model constructed at block 520.

At block 550, content may be distributed, such as to addressable receivers, based on the application of the differentiator model at block 545. Addressable television receivers determined to be associated with viewers that likely conform to the viewership target model based on application of the differentiator model (or the differentiator model itself) at block 545 may be selected to receive particular content. This content may be distributed via the television service provider's network and may be addressed specifically to television receivers identified by the differentiator model of block 545 as likely matching the viewership target model. Therefore, for example, use of method 500 may result in content being more accurately distributed and allowing for a decrease in the amount of addressed content being sent to addressable television receivers because such content is more accurately distributed. That is, an advertiser may be willing to have an advertisement distributed to a smaller population of television receivers and associated viewers since the advertiser is aware that the advertisement is more accurately being targeted to a particular desired target audience. In some embodiments, the data produced using the differentiator model at block 545 may be distributed (or the differentiator model itself) to a third-party. For instance, the differentiator model or its output results can be provided to a third-party vendor via the Internet.

In method 500, content is distributed to addressable receivers based on the application of the differentiator model at block 550. Depending on the particular advertisement or content distributed, the efficacy of the targeting can be assessed using viewership information later retrieved from television receivers or obtained from a third-party source. Alternatively, such an analysis can be conducted irrespective of whether content is distributed to addressable television receivers based on methods 400 and 500. Table 1 below details four categories of advertisement scenarios.

TABLE 1

| (1) | (2) |
|---|---|
| Impression on television distribution network; measurement on television distribution network. | Impression by third party system; measurement on television distribution network. |
| (3) | (4) |
| Impression on television distribution network; measurement by third party system. | Impression by third party system; measurement by third party system. |

In block (1), an impression is made using the television distribution network and the effect of the impression is measured using the television distribution network. A scenario in which block (1) may be applicable is when the impression is an advertisement for a television program. The viewership of the television program can be measured and analyzed using viewership data obtained from television receivers to analyze the number of viewers that were exposed to the advertisement as to whether they viewed the commercial. In block (2), the initial impression is made using a system other than the television distribution system, but the results are measured using the television distribution system. For example, if an advertisement is distributed using social media or radio, the effect of the advertisement may be measured using the television programming distribution network. In block (2), for a third-party distribution platform such as social media, it can be known specific users who were exposed to the advertisement and, as such, the third-party provider may create an impression log that indicates the specific advertisements to which the user was exposed. In block (3), an impression is made using the television distribution network and the effect of the impression is measured using a third-party system distinct from the television distribution network and viewership analysis system. An example of such a scenario is when an advertisement is targeted using the television distribution system, but the effect would only be observed via third party data. For example, an advertisement for a truck: viewers may be exposed to a commercial for truck using the television service provider system, but whether a viewer actually purchased the truck may be determined using data collected by a third-party as to who purchased the truck. Block (4) is inapplicable to the embodiments detailed herein because both the impression and the measurement is made using systems other than the television distribution system.

Using viewership data gathered using the television programming distribution system, possibly in combination with data gathered from a third-party system, the efficacy of advertisements distributed according to methods 400 and 500 can be assessed in accordance with blocks (1) through (3). For example, referring to block (1), viewers who were exposed to the targeted television commercial (the impression) via the television provider system may be compared to the television viewing population as a whole to assess whether the viewers exposed to the commercial were more likely to view the television program. As another example, referring to block (2), viewers who were exposed to a targeted advertisement on social media may be compared to the television viewing population as a whole to assess whether the viewers who received the impression on social media were more likely to view the television program than another population. Such information may be provided to the advertisers to demonstrate the efficacy of an advertising campaign and to leverage the capabilities of the viewership data fed back from the television receivers capable of bi-directional communication.

FIG. 6 illustrates an embodiment of a television receiver that is capable of bidirectional communication with a television service provider system and can provide viewership data. Television receiver 600 may be in the form of a separate device configured to be connected with a display device, such as a television. Embodiments of television receiver 600 can include set top boxes (STBs). As previously noted, in addition to being in the form of an STB, a television receiver may be incorporated as part of another device, such as a television or other form of display device. For example, a television may have an integrated television receiver (which does not involve an external STB being coupled with the television).

Television receiver 600 may represent television receiver 150 of FIG. 1 and may be in the form of an STB that outputs video and/or audio to a display device, such as a television. Television receiver 600 may be incorporated as part of a television, such as television 160. Television receiver 600 may include: processors 610 (which may include control processor 610-1, tuning management processor 610-2, and possibly additional processors), tuners 615, network interface 620, non-transitory computer-readable storage medium 625, electronic programming guide (EPG) database 630, television interface 635, networking information table (NIT) 640, digital video recorder (DVR) database 645 (which may include provider-managed television programming storage and/or user-defined television programming), on-demand programming 627, viewership database 631, user input device 650, decryption processing component 660 (which can be in the form of a removable or non-removable smartcard), and/or descrambling engine 665. In other embodiments of television receiver 600, fewer or greater numbers of components may be present. It should be understood that the various components of television receiver 600 may be implemented using hardware, firmware, software, and/or some combination thereof. Functionality of components may be combined; for example, functions of descrambling engine 665 may be performed by tuning management processor 610-2. Further, functionality of components may be spread among additional components; for example, PID (packet identifier) filters 655 may be handled by separate hardware from program management table 657.

Processors 610 may include one or more specialized and/or general-purpose processors configured to perform processes such as tuning to a particular channel, accessing and displaying EPG information from EPG database 630, and/or receiving and processing input from a user. For example, processors 610 may include one or more processors dedicated to decoding video signals from a particular format, such as MPEG, for output and display on a television and for performing decryption. It should be understood that the functions performed by various modules of FIG. 6 may be performed using one or more processors. As such, for example, functions of descrambling engine 665 may be performed by control processor 610-1.

Control processor 610-1 may communicate with tuning management processor 610-2. Control processor 610-1 may control the recording of television channels based on timers stored in DVR database 645. Control processor 610-1 may also provide commands to tuning management processor 610-2 when recording of a television channel is to cease. In addition to providing commands relating to the recording of television channels, control processor 610-1 may provide commands to tuning management processor 610-2 that indicate television channels to be output to decoder module 633 for output to a display device. Control processor 610-1 may also communicate with network interface 620 and user input device 650. Control processor 610-1 may handle incoming data from network interface 620 and user input device 650. Additionally, control processor 610-1 may be configured to output data via network interface 620. Control processor 610-1 may perform the functionality of a content and viewership processor engine 611. Content and viewership processor engine 611 may serve to store an indication of the television channels, date, and times viewed by one or more viewers using television receiver 600 to viewership database 631, such data may at a later time be transmitted to the television service provider. Content and viewership processor engine 611 may further serve to insert locally-stored targeted commercials into live streams of television channels or content (or stored programming, such as recorded content). Such locally-stored targeted commercials may be stored by storage medium 625 and received from the television service provider via either network interface 620 or via one or more tuners of tuners 615.

Tuners 615 may include one or more tuners used to tune to transponders that include broadcasts of one or more television channels. In the illustrated embodiment of television receiver 600, three tuners are present (tuner 615-1, tuner 615-2, and tuner 615-3). In other embodiments, two or more than three tuners may be present, such as four, six, or eight tuners. Each tuner contained in tuners 615 may be capable of receiving and processing a single transponder stream from a satellite transponder at a given time. As such, a single tuner may tune to a single transponder stream at a given time. If tuners 615 include multiple tuners, one tuner may be used to tune to a television channel on a first transponder stream for display using a television, while another tuner may be used to tune to a television channel on a second transponder for recording and viewing at some other time. If multiple television channels transmitted on the same transponder stream are desired, a single tuner of tuners 615 may be used to receive the signal containing the multiple television channels for presentation and/or recording. Tuners 615 may receive commands from tuning management processor 610-2. Such commands may instruct tuners 615 which frequencies or transponder streams to tune. Tuners may be used to receive and output live content, such as television channels or may be used to store content to the television receiver's storage medium 625. Content received via tuners 615 may be broadcast to some or all television receivers that are part of the television service provider's network or may be addressed to particular television receivers. Therefore, television receiver 600 can have a particular address unique from other television receivers that are part of the television service provider system that allows television receiver 600 to receive data addressed specifically to television receiver 600 or to a subset of the television receivers in communication with the television service provider. This address or identifier of the television receiver may be stored by decryption processing component 660 or some other component of television receiver 600.

Network interface 620 may be used to communicate via an alternate communication channel with a television service provider, if such communication channel is available. If network interface 620 is able to communicate with the television service provider system, television receiver 600 can be understood to be a bidirectional communication television receiver. If network interface 620 is not present or cannot communicate with the television service provider system, television receiver 600 can be understood to be an addressable television receiver (without bidirectional communication functionality). Referring back to FIG. 1, television receiver 150 may be able to communicate with television service provider system 110 via a network, such as the Internet. This communication may be bidirectional: data may be transmitted from television receiver 150 to television service provider system 110 and from television service provider system 110 to television receiver 150. Referring back to FIG. 6, network interface 620 may be configured to communicate via one or more networks, such as the Internet, to communicate with television service provider system 110 of FIG. 1. Information may be transmitted and/or received via network interface 620. For instance, network interface 620 may be used to provide viewership data from viewership database 631 to television service provider system 110.

Storage medium 625 may represent one or more non-transitory computer-readable storage mediums. Storage medium 625 may include memory and/or a hard drive. Storage medium 625 may be used to store information received from one or more satellites and/or information received via network interface 620. Storage medium 625 may store information related to EPG database 630, local viewership database 631 (which includes viewership data locally performed at television receiver 600), DVR database 645, and/or on-demand programming 627. Recorded television programs, which were recorded based on a provider- or user-defined timer may be stored using storage medium 625 as part of a DVR database. Storage medium 625 may be partitioned or otherwise divided (such as into folders) such that predefined amounts of storage medium 625 are devoted to storage of television programs recorded due to user-defined timers and stored television programs recorded due to provider-defined timers.

Inventory management database 216 may store a log that indicates: the daypart (e.g., primetime, late night, daytime, overnight, early morning, fringe) or specific start and/or end times along with the television channel on which an addressable advertisement may be inserted. Such an addressable advertisement can be inserted by the television service provider into specific slots in commercials breaks designated for addressable advertisement insertion. Such addressable advertisements can be targeted to particular television receivers rather than being broadcast to all television receivers that are currently outputting or recording the television channel. Inventory management database 216 may be maintained internally or may be maintained externally by a third party system, to which access may be acquired. Data stored by inventory management database 216 is used by the addressable advertisement insertion system (not pictured) so that addressable advertisements are inserted in the appropriate time slots within commercial breaks. Further, data from inventory management database 216 can be used to determine on how many televisions the inserted advertisement was likely viewed.

Such data along with demographic and address database 220 can be used for forecasting viewership events and aggregating such forecasts to determine how many advertising impressions a particular viewer is likely to have either on a particular television channel at a specific date and time, or in aggregate over a certain period of time (such as a day, week, month or quarter). For example, based on viewership data obtained from television receivers, if it is known that a viewer of a certain age/gender/ethnicity etc. watch certain amounts of CNN, TNT and TBS, then that information can be used in conjunction with data from inventory management data to forecast that these receivers are likely to watch a specific number of addressable advertisements and/or specific timeslots of addressable advertisements.

EPG database 630 may store information related to television channels and the timing of programs appearing on such television channels. EPG database 630 may be stored using storage medium 625, which may be a hard drive. Information from EPG database 630 may be used to inform users of what television channels or programs are popular and/or provide recommendations to the user. Information from EPG database 630 may provide the user with a visual interface displayed by a television that allows a user to browse and select television channels and/or television programs for viewing and/or recording. Information used to populate EPG database 630 may be received via network interface 620 and/or via satellites, such as satellites 130 of FIG. 1 via tuners 615. For instance, updates to EPG database 630 may be received periodically via satellite. EPG database 630 may serve as an interface for a user to control DVR functions of television receiver 600, and/or to enable viewing and/or recording of multiple television channels simultaneously.

The network information table (NIT) 640 may store information used by television receiver 600 to access various television channels. NIT 640 may be stored locally by a processor, such as tuning management processor 610-2 and/or by storage medium 625. Information used to populate NIT 640 may be received via satellite (or cable) through tuners 615 and/or may be received via network interface 620 from the television service provider. As such, information present in NIT 640 may be periodically updated. In some embodiments, NIT 640 may be locally-stored by television receiver 600 using storage medium 625. Generally, NIT 640 may store information about a service provider network, such as a satellite-based service provider network. Information that may be present in NIT 640 may include: television channel numbers, satellite identifiers (which may be used to ensure different satellites are tuned to for reception of timing signals), frequency identifiers and/or transponder identifiers for various television channels. In some embodiments, NIT 640 may contain additional data or additional tables may be stored by the television receiver. For example, while specific audio PIDs and video PIDs may not be present in NIT 640, a channel identifier may be present within NIT 640 which may be used to look up the audio PIDs and video PIDs in another table, such as a program map table (PMT). In some embodiments, a PID associated with the data for the PMT is indicated in a separate table, program association table (PAT), which is not illustrated in FIG. 6. A PAT may be stored by the television receiver in a similar manner to the NIT. For example, a PMT may store information on audio PIDs, and/or video PIDs. A PMT stores data on ECM (entitlement control message) PIDs for television channels that are transmitted on a transponder frequency. If, for a first television channel, multiple television channels are to be tuned to, NIT 640 and/or PMT 657 may indicate a second television channel that is to be tuned to when a first channel is tuned to.

Based on information in the NIT, it may be possible to determine the proper satellite and transponder to which to tune for a particular television channel. In some embodiments, the NIT may list a particular frequency to which to tune for a particular television channel. Once tuned to the proper satellite/transponder/frequency, the PMT PID may be used to retrieve a program management table that indicates the PIDs for audio and video streams of television channels transmitted by that transponder.

Decoder module 633 may serve to convert encoded video and audio into a format suitable for output to a display device. For instance, decoder module 633 may receive MPEG video and audio from storage medium 625 or descrambling engine 665 to be output to a television. MPEG video and audio from storage medium 625 may have been recorded to DVR database 645 as part of a previously-recorded television program. Decoder module 633 may convert the MPEG video and audio into a format appropriate to be displayed by a television or other form of display device and audio into a format appropriate to be output from speakers, respectively. Decoder module 633 may have the ability to convert a finite number of television channel streams received from storage medium 625 or descrambling engine 665 simultaneously. For instance, each of decoders 634 within decoder module 633 may be able to only decode a single television channel at a time. While decoder module 633 is illustrated as having three decoders 634 (decoder 634-1, decoder 634-2, and decoder 634-3), in other embodiments, a greater or fewer number of decoders may be present in television receiver 600. A decoder may be able to only decode a single high definition television program at a time.

Television interface 635 may serve to output a signal to a television (or another form of display device) in a proper format for display of video and playback of audio. As such, television interface 635 may output one or more television channels, stored television programming from storage medium 625 (e.g., television programs from DVR database 645, television programs from on-demand programming 630 and/or information from EPG database 630) to a television for presentation.

Digital Video Recorder (DVR) functionality may permit a television channel to be recorded for a period of time. DVR functionality of television receiver 600 may be managed by control processor 610-1. Control processor 610-1 may coordinate the television channel, start time, and stop time of when recording of a television channel is to occur. DVR database 645 may store information related to the recording of television channels. DVR database 645 may store timers that are used by control processor 610-1 to determine when a television channel should be tuned to and its programs recorded to DVR database 645 of storage medium 625. In some embodiments, a limited amount of storage medium 625 may be devoted to DVR database 645. Timers may be set by the television service provider and/or one or more users of television receiver 600.

DVR database 645 may also be used to record recordings of service provider-defined television channels. For each day, an array of files may be created. For example, based on provider-defined timers, a file may be created for each recorded television channel for a day. For example, if four television channels are recorded from 6-10 PM on a given day, four files may be created (one for each television channel). Within each file, one or more television programs may be present. The service provider may define the television channels, the dates, and the time periods for which the television channels are recorded for the provider-defined timers. The provider-defined timers may be transmitted to television receiver 600 via the television provider's network. For example, referring to satellite-based television distribution system 100 of FIG. 1, in a satellite-based television service provider system, data necessary to create the provider-defined timers at television receiver 150 may be received via satellite.

On-demand programming 627 may represent additional television programming stored by storage medium 625. On-demand programming 627 may include television programming that was not recorded to storage medium 625 via a timer (either user- or provider-defined). Rather, on-demand programming is programming provided to the television receiver directly for storage by the television receiver and for later presentation to one or more users. On-demand programming may not be user-selected. As such, the television programming stored to on-demand programming storage 627 may be the same for each television receiver of a television service provider.

User input device 650 may include a remote control (physically separate from television receiver 600) and/or one or more buttons on television receiver 600 that allow a user to interact with television receiver 600. User input device 650 may be used to select a television channel for viewing, view information from EPG database 630, and/or program a timer stored to DVR database 645, wherein the timer is used to control the DVR functionality of control processor 610-1. In some embodiments, it may be possible to load some or all of preferences to a remote control. As such, the remote control can serve as a backup storage device for the preferences.

Referring back to tuners 615, television channels received via satellite (or cable) may contain at least some scrambled data. Packets of audio and video may be scrambled to prevent unauthorized users (e.g., nonsubscribers) from receiving television programming without paying the television service provider. When a tuner of tuners 615 is receiving data from a particular transponder of a satellite, the transponder stream may be a series of data packets corresponding to multiple television channels. Each data packet may contain a packet identifier (PID), which, in combination with NIT 640 and/or PMT 657, can be determined to be associated with a particular television channel. Particular data packets, referred to as entitlement control messages (ECMs), may be periodically transmitted. ECMs may be associated with another PID and may be encrypted; television receiver 600 may use decryption engine 661 of decryption processing component 660 to decrypt ECMs. Decryption of an ECM may only be possible if the user has authorization to access the particular television channel associated with the ECM. When an ECM is determined to correspond to a television channel being stored and/or displayed, the ECM may be provided to decryption processing component 660 for decryption.

When decryption processing component 660 receives an encrypted ECM, decryption processing component 660 may decrypt the ECM to obtain some number of control words. In some embodiments, from each ECM received by decryption processing component 660, two control words are obtained. In some embodiments, when decryption processing component 660 receives an ECM, it compares the ECM to the previously received ECM. If the two ECMs match, the second ECM is not decrypted because the same control words would be obtained. In other embodiments, each ECM received by decryption processing component 660 is decrypted; however, if a second ECM matches a first ECM, the outputted control words will match; thus, effectively, the second ECM does not affect the control words output by decryption processing component 660. Decryption processing component 660 may be permanently part of television receiver 600 or may be configured to be inserted and removed from television receiver 600.

Data addressed specifically for television receiver 600 may be processed via decryption processing component 660. For instance, a message broadcast via the television service provider's system may be addressed specifically to television receiver based on an identifier or addressed of the television receiver stored by decryption processing component 660 or some other component of television receiver 600.

Tuning management processor 610-2 may be in communication with tuners 615 and control processor 610-1. Tuning management processor 610-2 may be configured to receive commands from control processor 610-1. Such commands may indicate when to start/stop recording a television channel and/or when to start/stop causing a television channel to be output to a television. Tuning management processor 610-2 may control tuners 615. Tuning management processor 610-2 may provide commands to tuners 615 that instruct the tuners which satellite, transponder, and/or frequency to tune to. From tuners 615, tuning management processor 610-2 may receive transponder streams of packetized data. As previously detailed, some or all of these packets may include a PID that identifies the content of the packet.

Tuning management processor 610-2 may be configured to create one or more PID filters 655 that sort packets received from tuners 615 based on the PIDs. When a tuner is initially tuned to a particular frequency (e.g., to a particular transponder of a satellite), a PID filter may be created based on the PMT data. The PID filter created, based on the PMT data packets, may be known because it is stored as part of NIT 640 or another table, such as a program association table (PAT). From the PMT data packets, PMT may be constructed by tuning management processor 610-2.

PID filters 655 may be configured to filter data packets based on PIDs. In some embodiments, PID filters 655 are created and executed by tuning management processor 610-2. For each television channel to be output for presentation or recorded, a separate PID filter may be configured. In other embodiments, separate hardware may be used to create and execute such PID filters. Depending on a television channel selected for recording/viewing, a PID filter may be created to filter the video and audio packets associated with the television channel (based on the PID assignments present in PMT 657). For example, if a transponder data stream includes multiple television channels, data packets corresponding to a television channel that is not desired to be stored or displayed by the user may be ignored by PID filters 655. As such, only data packets corresponding to the one or more television channels desired to be stored and/or displayed may be filtered and passed to either descrambling engine 665 or decryption processing component 660; other data packets may be ignored. For each television channel, a stream of video packets, a stream of audio packets (one or both of the audio programs) and/or a stream of ECM packets may be present, each stream identified by a PID. In some embodiments, a common ECM stream may be used for multiple television channels. Additional data packets corresponding to other information, such as updates to NIT 640, may be appropriately routed by PID filters 655. At a given time, one or multiple PID filters may be executed by tuning management processor 610-2.

Descrambling engine 665 may use the control words output by decryption processing component 660 in order to descramble video and/or audio corresponding to television channels for storage and/or presentation. Video and/or audio data contained in the transponder data stream received by tuners 615 may be scrambled. Video and/or audio data may be descrambled by descrambling engine 665 using a particular control word. Which control word output by decryption processing component 660 to be used for successful descrambling may be indicated by a scramble control identifier present within the data packet containing the scrambled video or audio. Descrambled video and/or audio may be output by descrambling engine 665 to storage medium 625 for storage (in DVR database 645) and/or to decoder module 633 for output to a television or other presentation equipment via television interface 635.

For simplicity, television receiver 600 of FIG. 6 has been reduced to a block diagram; commonly known parts, such as a power supply, have been omitted. Further, some routing between the various modules of television receiver 600 has been illustrated. Such illustrations are for exemplary purposes only. The state of two modules not being directly or indirectly connected does not indicate the modules cannot communicate. Rather, connections between modules of the television receiver 600 are intended only to indicate possible common data routing. It should be understood that the modules of television receiver 600 may be combined into a fewer number of modules or divided into a greater number of modules. Further, the components of television receiver 600 may be part of another device, such as built into a television. Television receiver 600 may include one or more instances of various computerized components, such as disclosed in relation to computer system 700 of FIG. 7.

Figure 7:
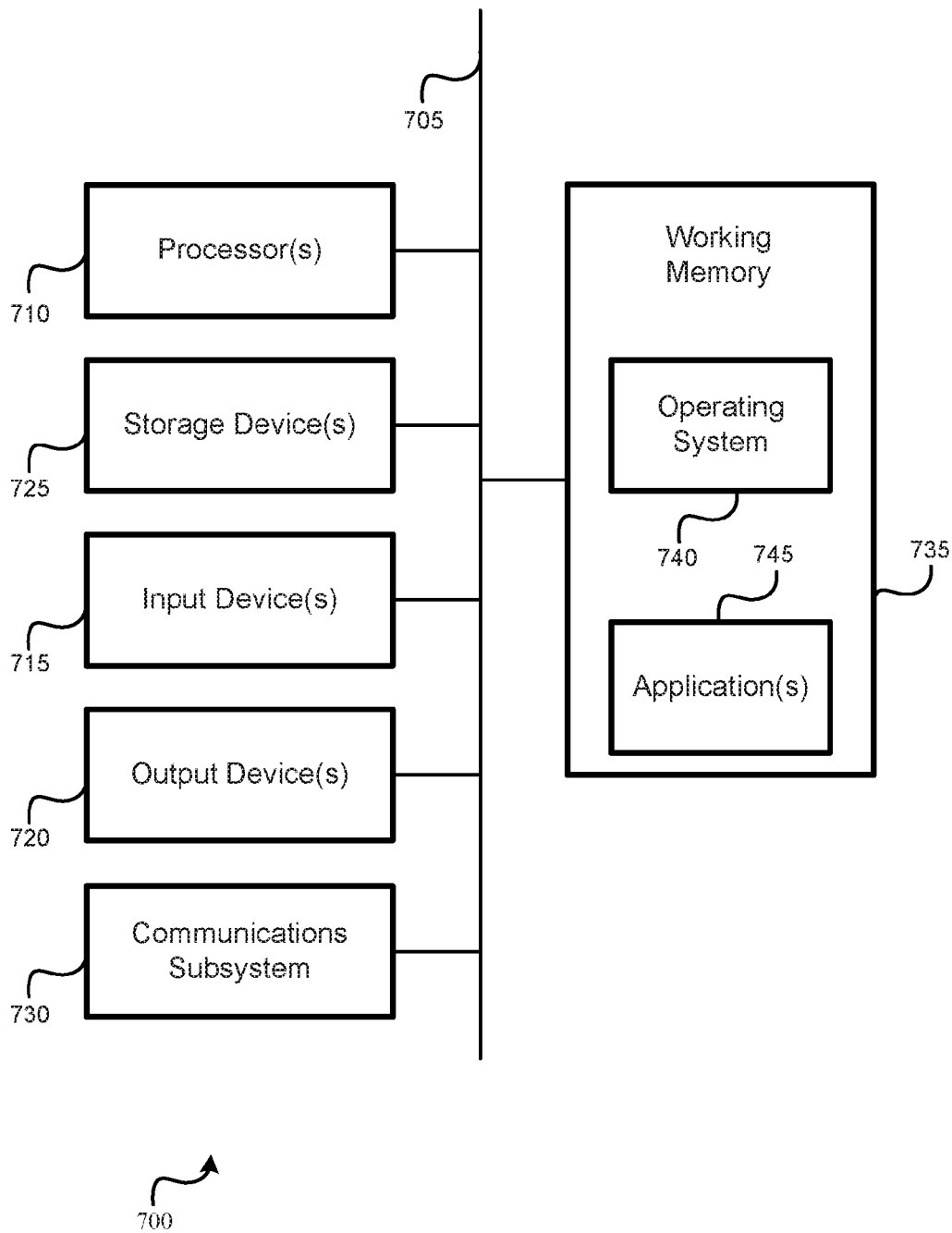
FIG. 7 illustrates an embodiment of a computer system that can be incorporated as part of the television service provider system.

FIG. 7 illustrates an embodiment of a computer system that can be incorporated as part of the television service provider system. Specifically, computer system 700 may be used to perform methods 500 and 700 and can function as various components of viewership modeling system 300 and viewership analysis system 210. FIG. 7 provides a schematic illustration of one embodiment of a computer system 700 that can perform various steps of the methods provided by various embodiments. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

The computer system 700 is shown comprising hardware elements that can be electrically coupled via a bus 705 (or may otherwise be in communication). The hardware elements may include one or more processors 710, including without limitation one or more general-purpose processors and/or one or more special-purpose processors (such as digital signal processing chips, graphics acceleration processors, video decoders, and/or the like); one or more input devices 715, which can include without limitation a mouse, a touchscreen, keyboard, remote control, and/or the like; and one or more output devices 720, which can include without limitation a display device, a printer, etc.

The computer system 700 may further include (and/or be in communication with) one or more non-transitory storage devices 725, which can comprise, without limitation, local and/or network accessible storage, and/or can include, without limitation, a disk drive, a drive array, an optical storage device, a solid-state storage device, such as a solid state drive ("SSD"), random access memory ("RAM"), and/or a read-only memory ("ROM"), which can be programmable, flash-updateable and/or the like. Such storage devices may be configured to implement any appropriate data stores, including without limitation, various file systems, database structures, and/or the like.

The computer system 700 might also include a communications subsystem 730, which can include without limitation a modem, a network card (wireless or wired), an infrared communication device, a wireless communication device, and/or a chipset (such as a Bluetooth™ device, BLE, an 802.11 device, an 802.15.4 device, a WiFi device, a WiMax device, cellular communication device, etc.), and/or the like. The communications subsystem 730 may permit data to be exchanged with a network (such as the network described below, to name one example), other computer systems, and/or any other devices described herein. In many embodiments, the computer system 700 will further comprise a working memory 735, which can include a RAM or ROM device, as described above.

The computer system 700 also can comprise software elements, shown as being currently located within the working memory 735, including an operating system 740, device drivers, executable libraries, and/or other code, such as one or more application programs 745, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the non-transitory storage device(s) 725 described above. In some cases, the storage medium might be incorporated within a computer system, such as computer system 700. In other embodiments, the storage medium might be separate from a computer system (e.g., a removable medium, such as a compact disc), and/or provided in an installation package, such that the storage medium can be used to program, configure, and/or adapt a general purpose computer with the instructions/code stored thereon. These instructions might take the form of executable code, which is executable by the computer system 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 700) to perform methods in accordance with various embodiments of the invention. According to a set of embodiments, some or all of the procedures of such methods are performed by the computer system 700 in response to processor 710 executing one or more sequences of one or more instructions (which might be incorporated into the operating system 740 and/or other code, such as an application program 745) contained in the working memory 735. Such instructions may be read into the working memory 735 from another computer-readable medium, such as one or more of the non-transitory storage device(s) 725. Merely by way of example, execution of the sequences of instructions contained in the working memory 735 might cause the processor(s) 710 to perform one or more procedures of the methods described herein.

The terms "machine-readable medium," "computer-readable storage medium" and "computer-readable medium," as used herein, refer to any medium that participates in providing data that causes a machine to operate in a specific fashion. These mediums may be non-transitory. In an embodiment implemented using the computer system 700, various computer-readable media might be involved in providing instructions/code to processor(s) 710 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the non-transitory storage device(s) 725. Volatile media include, without limitation, dynamic memory, such as the working memory 735.

Common forms of physical and/or tangible computer-readable media include, for example, a floppy disk, a flexible disk, hard disk, magnetic tape, or any other magnetic medium, a CD-ROM, any other optical medium, any other physical medium with patterns of marks, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 710 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 730 (and/or components thereof) generally will receive signals, and the bus 705 then might carry the signals (and/or the data, instructions, etc. carried by the signals) to the working memory 735, from which the processor(s) 710 retrieves and executes the instructions. The instructions received by the working memory 735 may optionally be stored on a non-transitory storage device 725 either before or after execution by the processor(s) 710.

It should further be understood that the components of computer system 700 can be distributed across a network. For example, some processing may be performed in one location using a first processor while other processing may be performed by another processor remote from the first processor. Other components of computer system 700 may be similarly distributed. As such, computer system 700 may be interpreted as a distributed computing system that performs processing in multiple locations. In some instances, computer system 700 may be interpreted as a single computing device, such as a distinct laptop, desktop computer, or the like, depending on the context.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A television programming distribution network system, comprising:
    a plurality of addressable television receivers, wherein each addressable television receiver comprises: a plurality of tuners that receive television programming from a television service provider broadcast system of a television service provider;
a plurality of bi-directional communication television receivers, wherein each bi-directional communication television receiver comprises:
a plurality of tuners that receive television programming from the television service provider broadcast system of the television service provider; and
a communication interface that transmits viewership information to a viewership analysis system of the television service provider; and
the viewership analysis system comprising:
a subscriber database that relates physical addresses of structures at which the plurality of bi-directional communication television receivers are installed with identifiers of the bi-directional communication television receivers; and
a viewership modeling server system, comprising:
one or more processors; and
a memory communicatively coupled with and readable by the one or more processors and having stored therein processor-readable instructions which, when executed by the one or more processors, cause the one or more processors to:
construct a viewership target model using the viewership information received from the plurality of bi-directional communication television receivers and data from the subscriber database, wherein the viewership target model indicates a subset of the plurality of bi-directional communication television receivers;
train a differentiator model using the viewership target model, wherein the differentiator model uses demographic data and/or address data, but viewership data is unavailable, to identify addressable television receivers that fit the viewership target model;
apply the differentiator model to the plurality of addressable television receivers, wherein:
each addressable television receiver of the plurality of addressable television receivers can be addressed individually by the television service provider but cannot transmit information to the television service provider; and
distribute content to at least a subset of the plurality of addressable television receivers based on applying the differentiator model to the plurality of addressable television receivers.

2. The television programming distribution network system of claim 1, wherein the viewership analysis system further comprises a communication interface that communicates with a demographic database, wherein the demographic database is distinct from the subscriber database and the demographic database relates demographic information with the physical addresses of structures.

3. The television programming distribution network system of claim 2, wherein the viewership modeling server system being configured to construct the viewership target model comprises the viewership target model being constructed using demographic data from the demographic database.

4. The television programming distribution network system of claim 1, wherein the viewership modeling server system being configured to construct the viewership target model further comprises processor readable instructions which, when executed by the one or more processors, cause the one or more processors to:
identify a television program;
rank the plurality of bi-directional communication television receivers based on an amount of time the television program was viewed with a defined time range using each of the plurality of bi-directional communication television receivers; and
create the viewership target model to target bi-directional communication television receivers of the plurality of bi-directional communication television receivers that have the highest ranking based on the amount of time that the television program was viewed.

5. The television programming distribution network system of claim 2, wherein the viewership modeling server system being configured to construct the viewership target model further comprises processor readable instructions which, when executed by the one or more processors, cause the one or more processors to:
identify a television program;
rank the plurality of bi-directional communication television receivers based on a number of times episodes of the television program were viewed with a defined time range using each of the plurality of bi-directional communication television receivers; and
create the viewership target model to target bi-directional communication television receivers of the plurality of bi-directional communication television receivers that have the greatest number of times episodes of the television program were viewed.

6. The television programming distribution network system of claim 1, wherein the information transmitted via the communication interface to the viewership modeling server system comprises: indications of television channels and durations for which the television channels were output for presentation.

7. The television programming distribution network system of claim 3, wherein the demographic database is maintained by a third party and the communication interface is configured to communicate via the Internet with the demographic database.

8. The television programming distribution network system of claim 1, further comprising a satellite-based television programming distribution network that broadcasts the television programming to the plurality of bi-directional communication television receivers.

9. A method for using a television programming distribution network with integrated predictive data gathering for distributing content, the method comprising:
broadcasting, using a television service provider network, a plurality of instances of television programming to a plurality of bi-directional communication television receivers and a plurality of addressable television receivers, wherein:
each of the plurality of bi-directional communication television receivers and the plurality of addressable television receivers comprises a plurality of tuners that receive television programming from a television service provider broadcast system of a television service provider;
collecting, from the plurality of bi-directional communication television receivers, via a bi-directional network communication channel, viewership information by a viewership analysis system wherein each instance of the viewership information is indicative of television programming received and viewed using a corresponding bi-directional communication television receiver of the plurality of bi-directional communication television receivers;

constructing, by the viewership analysis system, a viewership target model using the viewership information received from the plurality of bi-directional communication television receivers and data from a subscriber database accessible by the viewership analysis system, wherein the viewership target model indicates a subset of the plurality of bi-directional communication television receivers;

training, by the viewership analysis system, a differentiator model using the viewership target model, wherein the differentiator model uses demographic data and/or address data, but viewership data is unavailable, to identify addressable television receivers that fit the viewership target model;

applying, by the viewership analysis system, the differentiator model to the plurality of addressable television receivers, wherein:

each addressable television receiver of the plurality of addressable television receivers can be addressed individually by the television service provider but cannot transmit information to the television service provider; and distributing, by the viewership analysis system, content to at least a subset of the plurality of addressable television receivers based on applying the differentiator model to the plurality of addressable television receivers.

10. The method of claim 9, further comprising: retrieving, by the viewership analysis system, demographic information from a demographic database based on physical addresses stored in the subscriber database.

11. The method of claim 10, wherein constructing the viewership target model is at least partially based on the retrieved demographic data from the demographic database.

12. The method of claim 9, wherein constructing the viewership target model comprises:

identifying a television program;

ranking the plurality of bi-directional communication television receivers based on an amount of time the television program was viewed with a defined time range using each of the plurality of bi-directional communication television receivers; and creating the viewership target model to target bi-directional communication television receivers of the plurality of bi-directional communication television receivers that have the highest ranking based on the amount of time that the television program was viewed.

13. The method of claim 9, wherein constructing the viewership target model comprises:

identifying a television program;

ranking the plurality of bi-directional communication television receivers based on a number of times episodes of the television program were viewed with a defined time range using each of the plurality of bi-directional communication television receivers; and creating the viewership target model to target bi-directional communication television receivers of the plurality of bi-directional communication television receivers that have the greatest number of times episodes of the television program were viewed.

14. The method of claim 9, wherein the viewership information comprises indications of television channels and durations for which the television channels were output for presentation.

15. The method of claim 9, wherein broadcasting, using the television service provider network, the plurality of instances of television programming to the plurality of bi-directional communication television receivers and the plurality of addressable television receivers comprising using a satellite-based television programming distribution network to distribute the plurality of instances of television programming.

16. A non-transitory processor-readable medium, comprising processor-readable instructions that cause one or more processors to:

collect, from a plurality of bi-directional communication television receivers, via a bi-directional network communication channel, viewership information by a viewership analysis system wherein each instance of the viewership information is indicative of television programming received and viewed using a corresponding bi-directional communication television receiver of the plurality of bi-directional communication television receivers, wherein each of the plurality of bi-directional communication television receivers comprises a plurality of tuners that receive television programming from a television service provider broadcast system of a television service provider;

construct a viewership target model using the viewership information received from the plurality of bi-directional communication television receivers and data from a subscriber database accessible by the viewership analysis system, wherein the viewership target model indicates a subset of the plurality of bi-directional communication television receivers;

train a differentiator model using the viewership target model, wherein the differentiator model uses demographic data and/or address data, but viewership data is unavailable, to identify addressable television receivers that fit the viewership target model;

apply the differentiator model to a plurality of addressable television receivers, wherein:

each addressable television receiver of the plurality of addressable television receivers comprises a plurality of tuners that receive television programming from the television service provider broadcast system of the television service provider and each addressable television receiver of the plurality of addressable television receivers can be addressed individually by the television service provider but cannot transmit information to the television service provider; and distribute content to at least a subset of the plurality of addressable television receivers based on applying the differentiator model to the plurality of addressable television receivers.

17. The non-transitory processor-readable medium of claim 16, wherein the processor-readable instructions configured to cause the one or more processors to construct the viewership target model comprise processor-readable instructions that cause the one or more processors to:

identify a television program;

rank the plurality of bi-directional communication television receivers based on an amount of time the television program was viewed with a defined time range using each of the plurality of bi-directional communication television receivers; and create the viewership target model to target bi-directional communication television receivers of the plurality of bi-directional communication television receivers that have the highest ranking based on the amount of time that the television program was viewed.

18. The non-transitory processor-readable medium of claim 16, wherein the processor-readable instructions configured to cause the one or more processors to construct the viewership target model comprise processor-readable instructions that cause the one or more processors to:
   identify a television program;
   rank the plurality of bi-directional communication television receivers based on a number of times episodes of the television program were viewed with a defined time range using each of the plurality of bi-directional communication television receivers; and
   create the viewership target model to target bi-directional communication television receivers of the plurality of bi-directional communication television receivers that have the greatest number of times episodes of the television program were viewed.

19. The non-transitory processor-readable medium of claim 16, further comprising processor-readable instructions that cause the one or more processors to: retrieve demographic information from a demographic database based on physical addresses stored in the subscriber database.

20. The non-transitory processor-readable medium of claim 19, wherein the processor-readable instructions configured to cause the one or more processors to construct the viewership target model comprises processor-readable instructions that cause the one or more processors to use the retrieved demographic data from the demographic database.

* * * * *